May 19, 1925.  1,538,590
J. T. T. RANDLES
ELECTRICAL WELDING PROCESS
Filed Jan. 14, 1925
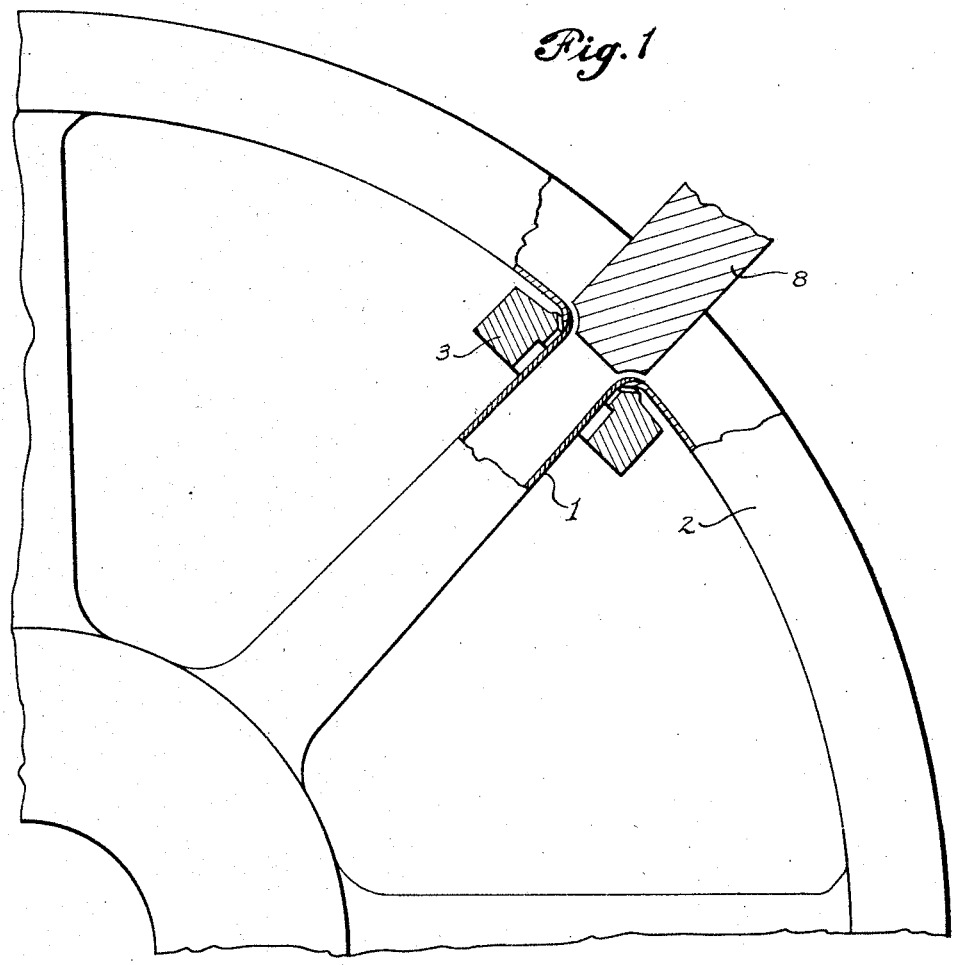
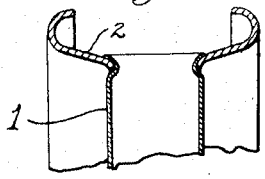
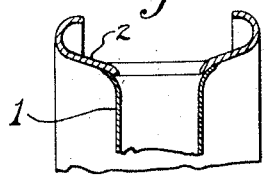
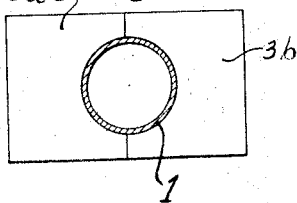
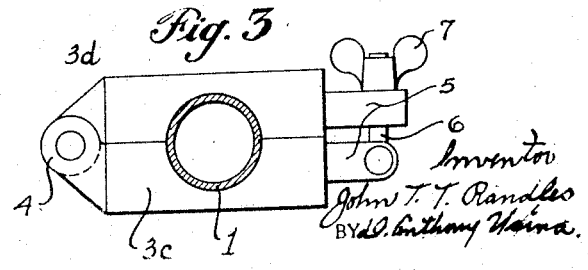

Patented May 19, 1925.

1,538,590

UNITED STATES PATENT OFFICE.

JOHN THOMAS TURNEY RANDLES, OF BIRMINGHAM, ENGLAND, ASSIGNOR TO DUNLOP RUBBER COMPANY LIMITED, OF BIRMINGHAM, ENGLAND.

ELECTRICAL WELDING PROCESS.

Application filed January 14, 1925. Serial No. 2,256.

*To all whom it may concern:*

Be it known that I, JOHN THOMAS TURNEY RANDLES, a British subject, and a resident of Birmingham, in the county of Warwick, England, have invented certain new and useful Improvements in Electrical Welding Processes, of which the following is a specification.

This invention relates to electric welding processes and comprises means whereby the flanged or tubular mouthed end of a hollow tubular metal member may be conveniently and advantageously welded to any other metal member provided with a hole or aperture therein to receive the end of the aforesaid tubular member.

The invention is particularly applicable to the manufacture of metal wheels of the type in which a tubular metal spoke is welded to the rim or felloe and it will accordingly be described with reference to the construction of such wheels.

In the manufacture of such wheels I prefer to employ spokes which are bell-mouthed or provided with an outwardly extending flange at one extremity and pass the same through suitably shaped holes or apertures in the wheel rim so that such flanges or bell-mouthed extremities fit snugly against those portions of the rim surrounding the said apertures. The end of the spoke may be passed through the aperture in the wheel rim prior to being flanged or if more convenient the edge of the aperture may be bent downwardly to provide an opening of sufficient size to allow the bell-mouthed or flanged end of the spoke to be passed therethrough. If this latter method is employed then the edge of the aperture will be bent upwardly, after the insertion of the end of the spoke, to engage beneath the bell-mouthed or flanged portion of the spoke.

According to this invention I provide an annular electrode to encircle one of the said spokes at a point immediately adjacent to the point where welding to the rim is desired. The other electrode is preferably shaped to conform to the inner shape and size of the outer extremity of the spoke and the aperture in the rim through which it passes. Either one or both electrodes may be movably mounted so that pressure may be readily exerted on the portions of metal to be welded together during the welding operation.

The annular electrode may be formed in two or more portions suitably connected to each other or to any convenient part of the welding machine to enable it to be attached to the spoke and removed therefrom before and after the operation of welding.

In order that the said invention may be clearly understood and readily carried into effect the same, will now be described with reference to the accompanying drawings, in which:—

Fig. 1 is a sectional view of the rim and spoke with electrodes applied according to my invention.

Fig. 2 shows in plan a tubular spoke with an annular electrode applied thereto.

Fig. 3 shows a similar view to Fig. 2, the annular electrode having its separate parts hinged.

Fig. 4 shows a section of a rim and a section of a tubular spoke passing through it.

Fig. 5 shows a modification in which the tubular spoke is applied to the outside of the rim.

Referring to Figs. 1, 2, 3 and 4 of the drawings a tubular bell-mouthed spoke 1 is fitted within an aperture in a rim 2 in the position in which it is desired to be welded, or as shown in Fig. 5 is fitted on the outside of the flange formed around such aperture. An annular electrode 3 is placed around the extremity of the tubular spoke adjacent to the part to be welded. The annular electrode is constructed in two parts, one part 3ª being fixed to the welding machine and the other part 3ᵇ being movable as shown in Fig. 2 and provided with suitable known means for clamping the same in position.

One method of constructing the annular electrode is shown in Fig. 3 in which a fixed part 3ᶜ is attached to the welding machine and a movable part 3ᵈ is attached to the part 3ᶜ by means of a hinge 4 at one end, the two portions being held securely together by means of lugs 5 having a bolt 6 and a wing nut 7 to clamp the same securely together.

A second electrode 8 is applied to the mouth of the tubular spoke 1 and is shaped so as to fit over that portion of the spoke which is to be welded to the rim 2 as shown in Figs. 1 and 4. In Fig. 5 the electrode 8 is applied to that portion of the rim 2 which overlaps the mouth of the spoke 1.

Although the invention has been described and illustrated as applied to the construction of wheels I do not limit it to such construction as it is obvious that it may be applied with equal convenience and advantage to any article of metal in which a tubular member is desired to be welded to any other member provided with an aperture for the purpose of receiving and providing seating for the extremity of such tubular member.

Though I have described with great particularity and detail certain embodiments in my invention, yet it is not to be understood that the invention is restricted to the particular embodiments disclosed. Various modifications may be made by those skilled in the art without departure from the invention as defined in the following claims.

What I claim is:—

1. The method of electrically welding a tubular metal member to another metal member having an aperture therein which consists in forming a flange around the aperture in the last mentioned member and flanging the end of the tubular metal member, then bringing the flanges together, and connecting by means of an electric current applied thereto by electrodes.

2. The method of electrically welding a tubular metal member to another metal member having an aperture therein which consists in forming a flange around the aperture in the last mentioned member and flanging the end of the tubular metal member, then bringing the flanges together, and connecting by means of an electric current applied thereto by electrodes, the electrodes being shaped to fit the flanged portions of the two members.

3. An electrode for welding a flanged tubular metal member to another metal member formed of sections adapted to fit around the tubular member and shaped to conform to the shape of the members adjacent the welding point.

In witness whereof, I have hereunto signed my name.

JOHN THOMAS TURNEY RANDLES.